United States Patent [19]

Morrison

[11] 4,273,309
[45] Jun. 16, 1981

[54] VALVE MECHANISM INCORPORATING UNIVERSAL SEAT SPRING

[75] Inventor: Bertram L. Morrison, Houston, Tex.

[73] Assignee: ACF Industries, Incorporated, New York, N.Y.

[21] Appl. No.: 20,765

[22] Filed: Mar. 15, 1979

[51] Int. Cl.³ .......................................... F16K 25/00
[52] U.S. Cl. .................................. 251/174; 251/315; 29/173; 267/161
[58] Field of Search ............... 251/174, 315; 267/161; 29/173

[56] References Cited

U.S. PATENT DOCUMENTS

| | | | |
|---|---|---|---|
| 2,174,171 | 9/1939 | Wasson | 29/173 X |
| 2,211,760 | 8/1940 | Berg | 29/173 X |
| 2,860,869 | 11/1958 | Utvitch | 29/173 X |
| 3,091,428 | 5/1963 | Magos | 251/174 X |
| 3,774,896 | 11/1973 | Rode | 267/161 X |
| 3,794,291 | 2/1974 | Suyama | 251/174 X |
| 3,883,112 | 5/1975 | Milleville | 251/174 |
| 3,964,737 | 6/1976 | Schober | 267/161 |

Primary Examiner—Harold W. Weakley
Attorney, Agent, or Firm—Eugene N. Riddle; Stephen T. Belsheim

[57] ABSTRACT

A valve mechanism according to the present invention incorporates at least one movable valve seat that is received within a seat pocket of the valve body and establishes sealing engagement with a movable valve element. An annular universal seat spring formed of a material such as standard carbon steel is deformed from a generally flat configuration to a frusto-conical configuration during assembly of the valve and exerts a force urging the valve seat against the valve element. Depending upon the depth of the seat pocket, the length of the valve seat and the size or thickness of the valve element, the seat spring will be deformed within its elastic limits or beyond the elastic limits of the material thereof, whereupon it will take a permanent set. In either case, the seat spring compensates for tolerance variations and exerts a spring force within a preselected narrow force range to ensure effective sealing capability and low torque operation.

17 Claims, 6 Drawing Figures

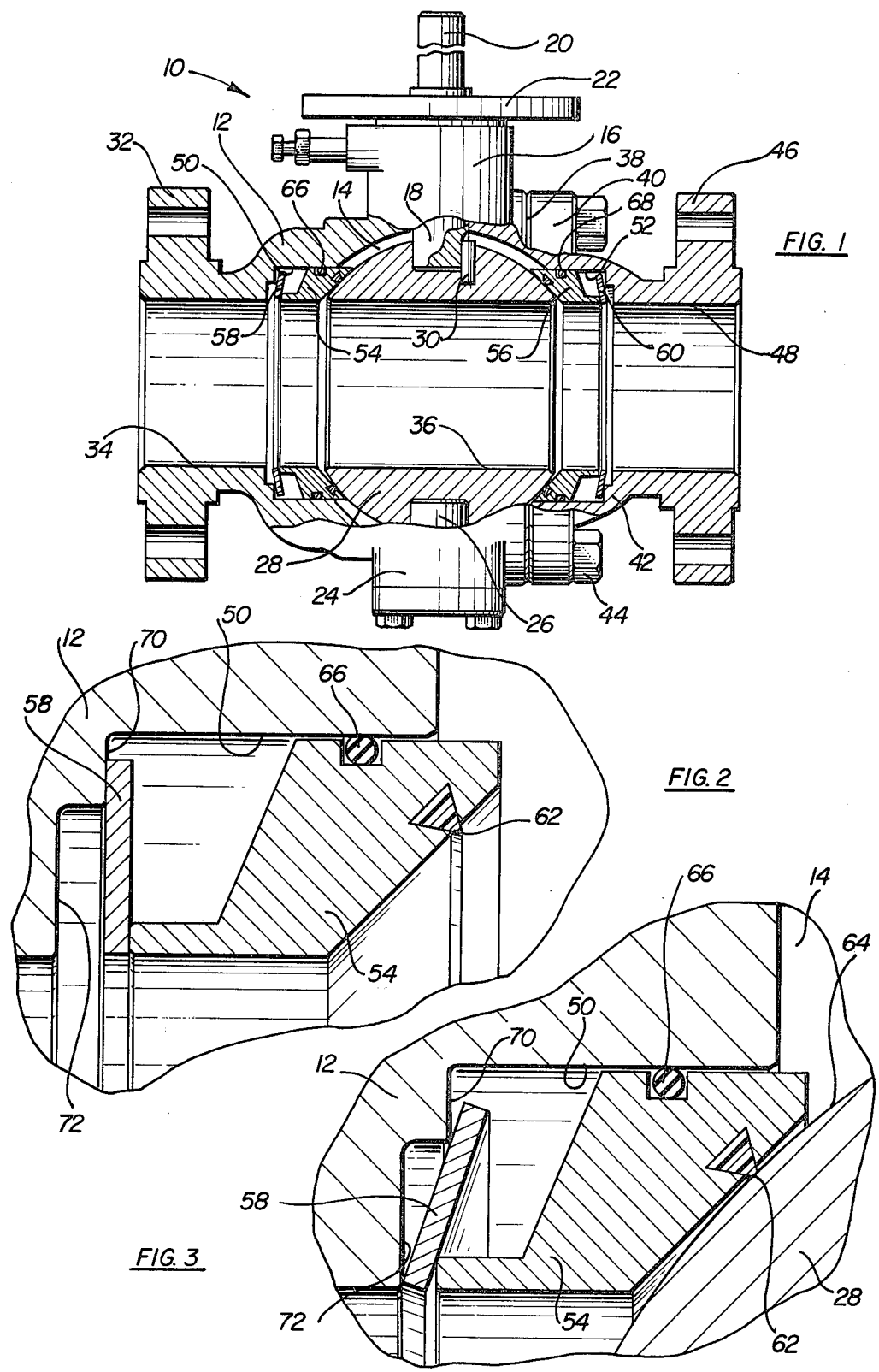

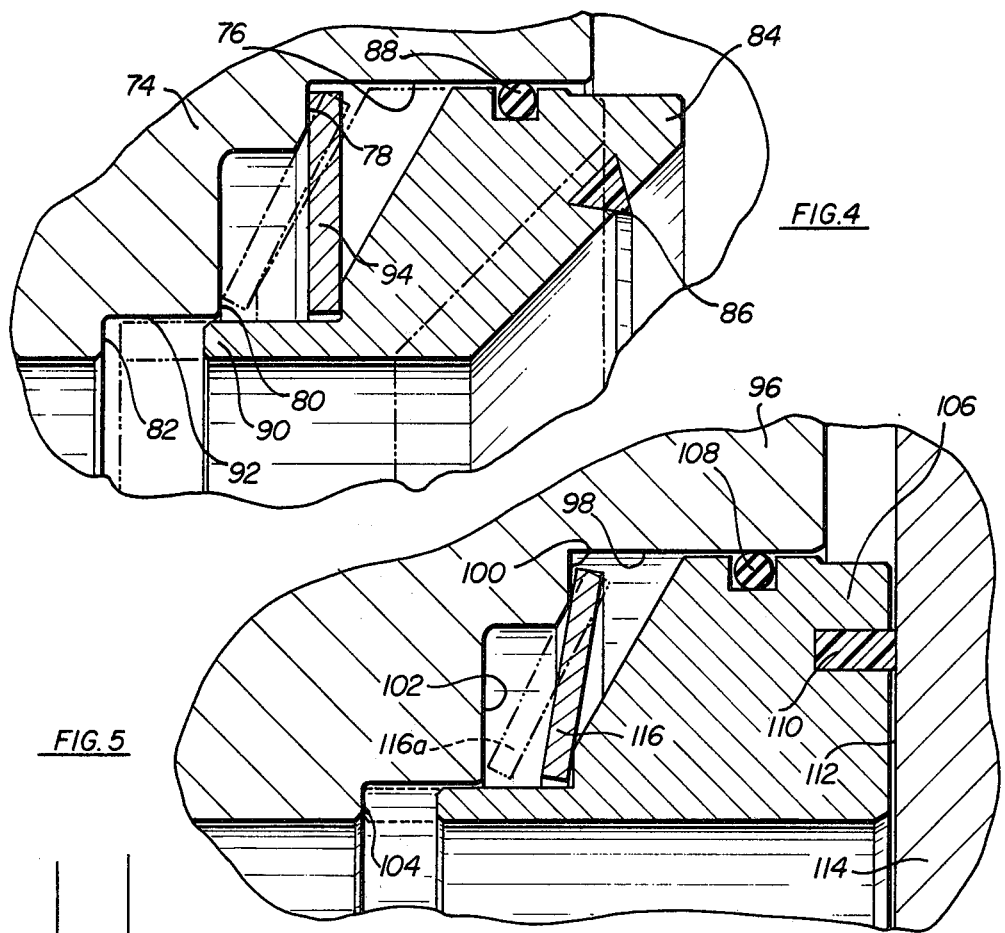
FIG. 4
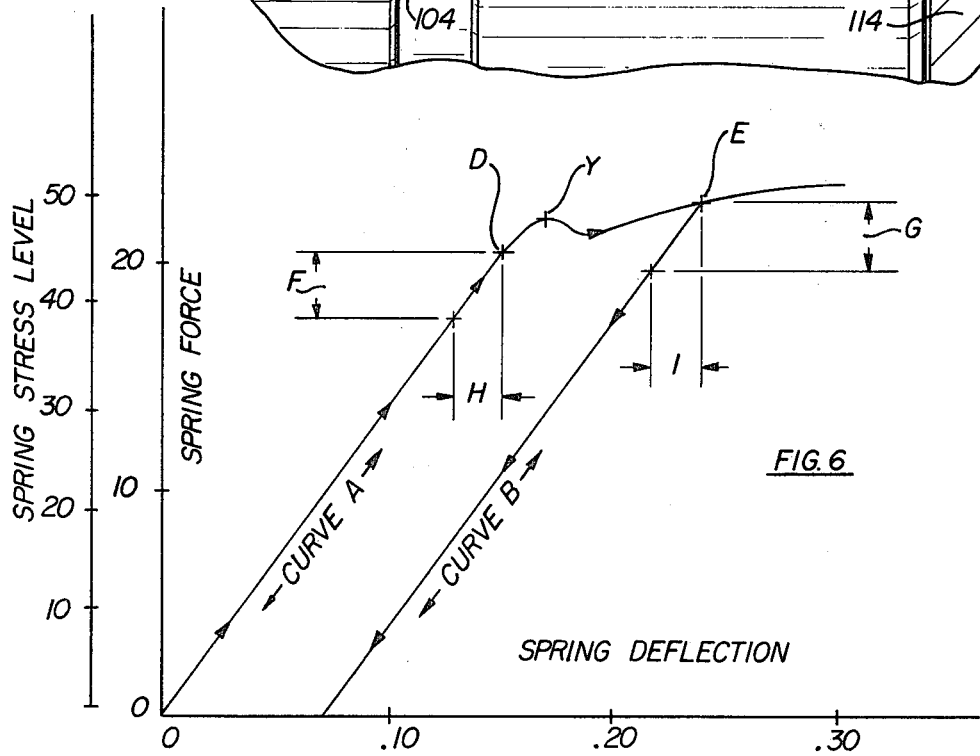
FIG. 5
FIG. 6

VALVE MECHANISM INCORPORATING UNIVERSAL SEAT SPRING

FIELD OF THE INVENTION

This invention relates generally to valves such as gate valves, ball valves, etc., and, more particularly, concerns valve constructions incorporating movable valve seats that are forcibly urged into sealing engagement with the valve element of such valves. Even more specifically, the present invention concerns utilization of a universal seat spring system that compensates for wide tolerance variations and yet accomplishes optimum seating force between the valve seat and valve element.

BACKGROUND OF THE INVENTION

In the manufacture of valves, in most cases it is desirable to provide movable seat elements that establish sealing engagement with a valve element and to incorporate some suitable means for imparting a particular preload force to the valve seat elements in order to establish proper sealing engagement between the seat elements and the valve element. This preload force is of particular advantage in providing effective sealing ability of the valve under low pressure conditions. Where movable valve seat elements are so employed, preload forces of sealing engagement may be developed mechanically, such as by through mechanical energy developed by seat springs. Alternatively, preload forces may be developed hydraulically, such as through utilization of forces developed by line pressure, in order to assist in the development of seating forces. Sealing preload forces may also be developed by elastomeric sealing rings that are maintained under mechanical compression. Obviously, seating systems may also be employed incorporating a combination of mechanical and hydraulic seat energization. The present invention is directed specifically to valve mechanisms incorporating mechanical seat springs that function to urge valve seats and seat assemblies into sealing engagement with the valve element.

One common valve design of the prior art incorporates helical compression springs that are retained within spring recesses defined within the valve body and impart a spring force to the valve seat. Another popular valve design incorporates flat or belleville type springs, such as evidenced by U.S. Pat. Nos. 3,091,428 of Magos; 3,883,112 of Milleville et al; and 4,066,240 of Atkinson et al. Belleville seat springs are typically manufactured in a pre-set, permanently deformed, dished or frusto-conical configuration and are deformed from this pre-set configuration during assembly of the valve mechanism, thus developing a preload force acting against the valve seat, urging the valve seat toward the valve element. In some cases, as evidenced by U.S. Pat. No. 3,834,666 of Keith, annular thrust developing springs may be utilized that are of flat configuration when unloaded.

One of the problems that is typically characteristic of belleville or flat type valve seat springs is the difficulty of such springs to compensate for manufacturing tolerances and maintain a preload force against the valve seat that is within acceptable design limits from the standpoint of sealing force and torque development. Flat or belleville springs are typically utilized under circumstances where internal movement of the valve mechanism is maintained at a minimum. Springs of this character develop and release stored mechanical energy with limited linear movement of the valve seat. Where valves are manufactured with relatively wide manufacturing tolerances, the variations due to such tolerances can result in sufficient seat movement as to be adverse to the development of optimum sealing ability and maintenance of operating torque within desired minimum operating levels. In other words, in order to ensure proper seating force and optimum operating torque when belleville springs are employed, it is typically desirable to manufacture the various valve parts with minimum tolerance variations. It is well known, however, that manufacturing costs increase exponentially as the range of manufacturing tolerance variations is minimized. It is desirable from a competitive standpoint to manufacture a valve mechanism where rather wide manufacturing tolerances are allowed, thus promoting low cost manufacture and insuring commercial feasibility of the valve product involved.

Another difficulty associated with the use of flat or belleville type seat springs in valves is the problem of hydrogen embrittlement and/or stress corrosion that may occur when such valve mechanisms are utilized under service conditions involving high concentrations of hydrogen sulfide. In the petroleum industry, petroleum products that are produced from many subsurface formations, known as sour gas or sour crude formations, contain high concentrations of hydrogen sulfide. When mechanical valve parts are composed of high carbon, rather hard metal spring materials and are maintained in stressed condition during service, the presence of hydrogen sulfide can result in rapid deterioration of these parts. It is desirable to provide seat springs for valves that are composed of materials that are not particularly susceptible to rapid deterioration in the presence of hydrogen sulfide.

Where valves utilizing conventional seat spring materials are manufactured with wide manufacturing tolerances, allowing considerable variation in the dimension of parts, it may be necessary to utilize different sized seat springs to compensate for variations in the manufacturing tolerances. It is desirable to provide flat or belleville type seat springs for valve mechanisms and to utilize a universal type belleville spring that will effectively compensate for variations in manufacturing tolerances and maintain optimum seating force and torque development.

SUMMARY OF THE INVENTION

In one suitable embodiment of the present invention, valves, such as ball valves, gate valves, and the like, are provided that incorporate a valve body defining a valve chamber within which is located a movable valve element for controlling the flow of fluid through the valve. The valve body also defines at least one seat pocket within which is movably received an annular seat member or seat assembly. An annular seat spring is also located within the seat pocket and serves to urge the valve seat into sealing engagement with the valve element. The annular seat spring is of universal nature and is constructed from a readily deformable material, such as low carbon or mild steel and, prior to assembly within the valve, is in the form of an annular, substantially flat ring disc. During assembly of the valve opposing forces are developed at the inner and outer peripheral portions of the seat spring as spring contacting portions of the valve body and seat are moved forcibly against respective peripheral portions of the seat spring.

The seat spring is thus deformed by these forces from an originally substantially flat configuration to a dished or frusto-conical configuration during such assembly. This spring deformation develops a seat preload force, acting against the valve seat that urges the valve seat into proper forcible sealing engagement with the valve element.

Under circumstances where manufacturing tolerances, such as seat pocket depth, are at a maximum, the universal seat spring will be deformed within its elastic limits and will substantially recover to its original flat condition when mechanical forces acting against it are relieved. In addition to compensation for manufacturing tolerances, the seat spring will effectively accommodate such transverse movement of the valve element as will occur during service conditions, and the range of spring force that is developed during operation of the valve throughout its designed service pressure range will remain within a rather narrow band of spring force.

Under circumstances where manufacturing tolerances, such as seat pocket depth, are at a minimum, the flat seat spring will be deformed beyond the elastic limits of the material from which it is composed and the seat ring will take a permanent set conforming to the effective dimensional arrangement that occurs due to accumulation of the tolerances tolerance stack-up. The material from which the seat spring is composed is so selected that, as permanently set, there is inconsequential increase in the development of spring force. Seating engagement between the valve seat and valve element, therefore, will be maintained within a relatively narrow force range regardless of whether the seat spring is yielded within or beyond beyond its elastic limits. The operational spring force for a yielded, permanently set seat spring will be maintained within a relatively narrow band of spring force during operation and will effectively compensate for movement of the valve element that occurs during service.

The material from which the seat spring is composed is quite inexpensive because it is standard carbon or mild steel, or the like, which is of substantially lower cost as compared to the cost of conventional spring steel materials, such as 17-4PH stainless steel and Inconel X750, for example. Moreover, the relatively soft material from which the seat spring is composed effectively precludes rapid spring deterioration in hydrogen sulfide service conditions.

It is therefore an object of the present invention to provide a novel valve construction wherein a wide range of manufacturing tolerance is allowed, thereby promoting the manufacture of low cost, competitive valve products.

It is also a feature of the present invention to provide a novel valve mechanism incorporating a seat spring that effectively compensates for variations in manufacturing tolerances, commonly referred to as tolerance stack-up.

Another feature of the present invention contemplates the provision of a novel valve mechanism incorporating a flat washer or belleville type seat spring that ensures maintenance of narrow torque and seating force ranges even though wide manufacturing tolerances occur during valve manufacture.

Yet another feature of the present invention involves the provision of a novel valve mechanism incorporating a seat spring that is capable of being stressed beyond its elastic limits during assembly, thus compensating for variations in manufacturing tolerances.

Still another feature of the present invention is to provide a novel valve mechanism incorporating a belleville type seat element that maintained optimum seating force and torque development whether the seat spring is deformed within its elastic limits or beyond the elastic limits of the material thereof during assembly of the valve mechanism.

It is also a feature of the present invention to provide a novel valve mechanism incorporating a belleville type seat spring that is of nominal cost, thus effectively promoting the commercial competitive nature of the valve product.

It is an even further feature of the present invention to provide a novel valve mechanism incorporating a seat spring structure that is effectively resistant to deterioration while utilized in service conditions incorporating high concentrations of hydrogen sulfide.

Various other objects, advantages and features of this invention will become apparent to those skilled in the art from the following discussion, taken in conjunction with the accompanying drawings, in which:

DESCRIPTION OF THE DRAWINGS

FIG. 1 is an elevational view of a ball valve construction manufactured in accordance with the present invention, having portions thereof broken away and illustrated in section.

FIG. 2 is a fragmentary sectional view of the valve mechanism of FIG. 1 illustrating one of the seat pockets with its associated seat member and further illustrating the seat spring in the unloaded condition thereof.

FIG. 3 is a fragmentary sectional view illustrating the structure of FIG. 2 and illustrating the seat spring as being deformed to a frusto-conical configuration within the seat pocket.

FIG. 4 is a fragmentary sectional view of a modified embodiment of the invention illustrating seat and seat spring positions at the unloaded and fully loaded positions thereof.

FIG. 5 is a fragmentary sectional view of a gate valve construction representing an alternative embodiment of the present invention and illustrating a movable seat and seat spring received within an appropriately designed seat pocket. The seat spring is shown partially loaded and fully loaded and unloaded by means of broken lines.

FIG. 6 is a graphical representation of a spring force and deflection curve, illustrating a seat spring of the present invention as being yielded beyond its elastic limits, taking a set and functioning under its permanently deformed or set condition.

The following is a discussion and description of preferred specific embodiments of the present invention, such being made with reference to the drawings, whereupon the same reference numerals are used to indicate the same or similar parts and/or structure. It is to be understood that such discussion and description is not to unduly limit the scope of this invention.

DETAILED DESCRIPTION

Referring now to the drawings for a better understanding of the present invention and, in particular, to FIG. 1, there is illustrated a ball valve construction generally at 10 having a body portion 12 that defines an internal valve chamber 14. The valve body structure 12 is also formed to define a valve stem boss 16 that defines an internal passage receiving a valve stem element 18. The valve stem extends through an appropriate packing chamber contained within boss 16 and presents an external portion 20 that may be fitted with any suitable manual or power actuator for the purpose of controlling the flow of fluid through the valve. A plate 22 may be provided at the upper portion of the boss 16 and may serve as a positioning plate in the event a manual valve operator is utilized for controlling the valve. In the alternative, the plate 22 may also provide for connection of any suitable valve actuator to the valve for imparting controlled rotation to the valve stem 18.

The valve body 12 is also formed to define a trunnion boss 24, opposing the valve stem boss 16 and providing support for a trunnion element 26. A rotatable valve element or ball 28 is positioned within the valve chamber 14 and defines opposed receptacles receiving the valve stem and trunnion elements. A nonrotatable relationship is established between the valve ball and the valve stem by means of a key element 30 that is received within appropriate key slots formed both in the valve ball and the valve stem. Thus, as the valve stem 18 is rotated, the valve ball is also rotated and thereby controls the flow of fluid through the valve.

The valve body 12 also defines a connection flange 32 for the purpose of establishing bolted connection of the valve to a flowline, not shown. The valve body is also formed to define an internal flow passage 34 with which a bore 36 of the valve ball 28 is positioned in registry in the open position of the valve.

Valve body 12 is formed to define a connection face 38 that receives the connection flange portion 40 of an end closure element 42 in sealed relation therewith. The flange 40 is maintained in intimate sealed engagement with the connection face 38 of the valve body 12 by means of a plurality of bolts 44. The end closure element 42 is also formed to define a flange 46 through which bolts or threaded studs may extend for the purpose of connecting the valve to an adjacent flange of a conduit and is further formed to define an internal flow passage 48 that registers with flow passage 34 of the valve body and also registers with bore 36 of the valve ball.

The basic body construction shown in FIG. 1 and discussed herein is not intended to limit the scope of this invention in any manner. It will be obvious as this discussion continues that valve body constructions of other suitable forms may be utilized within the spirit and scope of the present invention.

Referring now to FIG. 1 and to the enlarged fragmentary sectional view of FIGS. 2 and 3, the valve body 12 and end closure portion 42 are formed to define opposed annular seat pockets 50 and 52 within which are movably received annular seat members 54 and 56, respectively. Annular seat spring members 58 and 60 are also received within the annular seat pockets 50 and 52, respectively, and provide forces, acting upon the seat elements 54 and 56 to cause the annular sealing portion 62 thereof to establish intimate sealing engagement with the sealing surface 64 of the valve ball 28. Sealing engagement between the valve body and the seat members is maintained by annular O-ring type sealing elements 66 and 68 that are received within respective annular seal grooves formed at the outer peripheral portions of the seat elements 54 and 56.

For purposes of simplicity, FIGS. 2-5 illustrate enlarged fragmentary sectional portions of various valve body constructions with only one of the seat and seat spring assemblies being illustrated. As shown in FIGS. 2 and 3, the internal body structure defining seat pocket 50 is formed to define an internal annular stop shoulder 70 positioned for contact with the outer peripheral portion of the seat spring 58. FIG. 2 shows seat element 54 in a free position out of contact with ball 28 with spring member 58 in a flat position. After ball 28 is installed in the valve, spring member 58 is internally loaded and is slightly out of the flat position. Inner stop shoulder 72 is contacted by the radially inner portion of seat spring 58 only when the seat spring has been yielded to its maximum limit in the manner illustrated in FIG. 3. During normal operation of the valve, shoulder 72 would be out of contact with spring 58.

It is intended that the seat spring members 58 and 60 be capable of accommodating the degree of ball movement that occurs when the valve ball is shifted downstream to the position illustrated in FIG. 3 by line pressure acting against the closed valve ball. It is also desirable that valve springs 58 and 60 compensate for the tolerances and tolerance stack-up of the various movable internal parts of the valve. For example, tolerance differentiation may occur in valve ball diameter, seat length and seat pocket depth. Whether the tolerance stack-up is at a minimum or maximum, it is intended that the seating elements provide effectively for such tolerance stack-up and develop forces, acting upon the seat members to achieve optimum seat pressure between the seat members and the valve element. With regard to the spring force/spring deflection curve illustrated in FIG. 6, for example, it may be desirable to maintain a spring force of approximately twenty pounds per inch of circumference and it is also desirable to maintain the spring force within a relatively narrow band of spring force during all conditions of operation. The material from which the spring member is chosen, together with its particular characteristics of dimension determine the spring force or preload force that is exerted against the seat members to insure the maintenance of a low pressure seal between the seats and the valve element.

Where tolerance stack-up is at the maximum or minimum, however, conventional belleville type seat springs cannot accommodate the minimum or maximum conditions that occur unless manufacturing tolerances are maintained within very narrow limits. As explained above, maintenance of narrow tolerances typically results in high manufacturing costs and adversely affects the commercial feasibility of the valve product involved. It is desirable, therefore, to provide belleville type seat springs that will accommodate wide variations in manufacturing tolerances and yet maintain narrow bands of spring forces to ensure optimum sealing and acceptable operating torque.

In accordance with the present invention, the annular valve spring elements 58 and 60 are composed of low carbon mild steel or other such materials that are capable of providing proper spring force and deflection during normal operation, thus accommodating the limited degree of internal movement that occurs as the valve element shifts responsive to various pressure conditions. Where tolerance stack-up is at the minimum, total deflection of the annular seat springs may be well within the elastic limits of the material from which the springs are composed. Under this circumstance, the annular springs do not become overstressed and deformed and, in the unloaded condition thereof as shown in FIG. 2, remain of essentially planar configuration. In the other extreme of tolerance stack-up, however, the tolerances of the various parts may be such that, upon assembly, the seat springs become stressed beyond the elastic limits thereof. When this occurs, the material from which the seat springs are composed will take a permanent set and will be permanently deformed to a frusto-conical configuration such as shown in FIG. 3.

With reference again to FIG. 6, curve A represents the spring force and deflection of an annular seat spring that, to point D, is within the elastic limits of the material from which the spring is composed. As the spring deflection exceeds the level of point D, however, the elastic limits of the material will be exceeded and, at point Y, the yield point of the material, the seat spring will begin to take on a permanent deformation which deformation is determined by the total spring travel, i.e. point E occurs at the particular spring deflection achieving the controlled spring force. Subsequently, when mechanical stresses are relieved, spring recovery will be evidenced by curve B because of the permanently set condition of the spring. Subsequent mechanical loading of the permanent set spring will then occur along curve B as graphically represented in FIG. 6. As shown at F and G in FIG. 6, the bands of spring force during operation are quite narrow and, in each case, span the desired spring force characteristics of twenty pounds per inch of circumference as discussed above. Further, as shown at H and I for each of the curves A and B, seat movement due to valve ball shifting between its open and closed positions remains essentially the same.

The material from which the seat springs are composed is selected such that insignificant variations in spring force occur as spring deflection continues beyond the yield point Y. In other words, the curve from point Y to point E is considered relatively flat as compared to similar curves resulting from tests of conventional spring materials, such as mentioned above. Low carbon or mild steel is a material that functions well in accordance with the teachings of the present invention. It is not intended, however, to limit the present invention solely to the use of mild or low carbon steel, however, because it is expected that other suitable materials may be identified that will function acceptably within the spirit and scope of this invention.

In the manufacture of valves, one of the most difficult manufacturing variables to control is seat pocket depth. Obviously, manufacturing costs may be maintained at exceptionally low levels if wide manufacturing tolerances are allowed in seat pocket depth. From the standpoint of the present invention, where manufacturing tolerances of the seat pocket are at a minimum, maximum spring deflection will occur. Conversely, where maximum seat pocket depth tolerance occurs, the seat springs will be subjected to minimum deflection. The following example, together with the dimensions indicated, is typical for a particular twenty inch ball valve having a working pressure of 2,160 lbs. psi. Maximum seat pocket depth is 0.260 inches while minimum seat pocket variation is 0.175 inches. When the seat pocket tolerance is at its maximum, 0.260, spring deflection or preload will be in the order of 0.150 inches. At a minimum seat pocket depth tolerance of 0.175 inches, a maximum spring deflection of 0.235 inches will occur at the maximum seat pocket depth tolerance of 0.260 minimum spring force preload of approximately 0.15 inches will occur as evidenced at point D. In each case for curves A and B, seat ring travel due to ball movement is 0.030 inches at H and I for curves A and B.

Thus, by utilizing a standard carbon steel spring material, the annular spring elements 58 and 60 may be considered universal springs. The springs will readily conform to the particular manufacturing tolerance stack-up that occurs and, if necessary, will become deformed to accommodate these manufacturing tolerances. After deformed, the set springs will function in essentially the same manner as undeformed springs and will facilitate the maintenance of desired narrow bands of spring force during all operating conditions. By utilizing the universal nature of such seat springs, manufacturing tolerances can be maintained rather wide and manufacturing costs are thus maintained at the minimum. Relatively inexpensive spring materials are utilized, thereby further contributing to commercial enhancement of the valve product involved.

As discussed above, conventional spring materials in many cases react adversely under service conditions where high concentrations of hydrogen sulfide are present. Mild or low carbon steel, however, is especially resistant to deterioration under the influence of hydrogen sulfide. By using seat springs composed of standard carbon steel, spring deterioration by hydrogen sulfide is minimized.

Referring now to FIGS. 4 and 5, alternative embodiments of the present invention are shown. As in FIG. 4, seat and seat pocket configurations may take other suitable forms. As shown in FIG. 5, the present invention may be readily adapted to use in conjunction with gate valves. Referring now to FIG. 4, a valve body structure 74 is shown being formed to define a seat pocket 76 having annular stop shoulders 78, 80 and 82. Within the seat pocket is received an annular seat ring 84 having a sealing element 86 for establishing sealing engagement with the sealing surface of a valve ball and having an annular external seal groove within which is received an O-ring type sealing element 88 to establish a seal between the movable seat and the outer peripheral cylindrical surface of the seat pocket. Valve seat 84 also defines an inner peripheral axially extending stop portion 90 that cooperates with an annular cylindrical surface 92 to provide a closure, isolating the major portion of the seal pocket from the fluid flowing through the valve and defining a seat spring chamber within which an annular seat spring 94 is received. Spring 94 is shown at its unstressed condition in full line and is shown fully stressed in broken line as the valve seat 84 becomes shifted into the seat pocket to the full extent thereof. The seat assembly of FIG. 4 differs from that shown in FIG. 3 by virtue of the fact that the seat spring is fully isolated from the flow passage of the valve. The seat spring of FIG. 4, however, is formed of a spring material that will compensate for tolerance stack-up and function efficiently at both the yielded or unyielded conditions thereof to provide for optimum sealing with acceptable operating torque.

In FIG. 5, a gate valve body is shown fragmentarily at 96 defining an annular seat pocket 98 that forms stop shoulders 100, 102 and 104. An annular seat ring 106 is movably received within the seat pocket 98 and is maintained in a sealed relationship with the valve body structure by means of an annular O-ring type sealing element 108 that is received within an annular seal groove defined at the outer peripheral portion of the seat ring and which establishes a seal with the outer cylindrical surface defined by the seat pocket. Valve seat 106 also includes a face sealing element 110, formed of any suitable plastic or elastomeric sealing material that establishes a seal with the planar sealing surface 112 of a gate member 114.

As shown in full line, an annular seat spring 116 is deformed within the elastic limits thereof and develops a preload force acting upon the seat member 106, urging the seat member into sealing engagement with sealing surface 112 of the gate member 114 thereby developing sufficient mechanical pressure between the sealing element 110 and sealing surface 112 to insure optimum sealing even at low pressure conditions. As shown in broken lines at 116A, the seat spring is deformed beyond the elastic limits thereof where it has taken a permanent set due to the particular stack-up of manufacturing tolerances that is involved. Because of the low carbon steel from which the seat ring 116 is composed, whether stressed within or beyond the elastic limits of the spring material, the spring force urging seat 106 against the gate member 114 will differ only inconsequentially. The relatively flat curve established between the Y and E portions occurring after the yield point has been exceeded as in FIG. 6 will result in optimum sealing with only insignificant differences in operating torque.

As will become apparent from the foregoing description of this invention, universal seat springs may be simply and efficiently defined through utilization of low cost standard carbon spring materials and other spring materials of like function and characteristics. The spring materials are effectively resistant to deterioration in hydrogen sulfide service and are readily deformable to accommodate various manufacturing tolerances. The present invention effectively promotes low cost, wide tolerance manufacture of various valve components and, thus, enhances the competitive nature of the commercial product involved. In simple terms, each valve forms its own seat spring when assembled. The present invention is therefore well adapted to attain all of the objects and features hereinabove set forth, together with other objects and features that will be inherent from the description of the apparatus itself. The foregoing description, however, is not intended to limit the present invention to the specific embodiments or materials shown, it being apparent that the scope of the invention is defined solely by the following claims.

What is claimed is:

1. A valve mechanism comprising:
 a valve body defining a valve chamber and defining a flow passage intersecting said valve chamber, said valve body being formed to define at least one seat pocket within said valve body;
 a valve element being positioned within said valve chamber and being movable between open and closed positions to control the flow of fluid through said valve mechanism;
 a valve seat member being movably received within said seat pocket;
 at least one of said seat pocket, valve element and seat member having tolerances varying between a maximum and minimum; and
 a universal annular disc spring being located within said seat pocket, said disc spring being deformed by movement of said valve seat relative to said valve body from an initial substantially flat configuration to a yielded frusto-conical configuration and developing a spring force urging said valve seat into sealing engagement with said valve element, said disc spring being further deformed by further movement of said valve seat relative to said valve body in response to the pressure responsive movement of said valve element within said valve chamber, said disc spring being deformed beyond the elastic limits of the material thereof through at least a portion of the tolerance variation between said maximum and minimum to compensate for said tolerance variations, the spring force of said disc spring being within a preselected narrow band of spring force both within and beyond said elastic limits, whereby force exerted by said disc spring against said seat and hence against said valve element being within a predetermined range regardless of the degree of flexure of said disc spring.

2. A valve mechanism as recited in claim 1, wherein:
 the depth of said seat pockets varies through a wide tolerance range between a minimum depth and a maximum depth;
 deformation of said disc spring being at a minimum when seat pocket depth is at said maximum depth and being at a maximum when said seat pocket depth is at a minimum depth; and
 deformation of said disc spring being beyond the elastic limits of the material thereof through at least a portion of the tolerance variation between said minimum and maximum seat pocket depths.

3. A valve mechanism as recited in claim 1, wherein:
 the spring material from which said disc spring is composed is selected from those materials having limited variation in spring force from the yield point of the material to the point of maximum deflection beyond said yield point.

4. A valve mechanism as recited in claim 1, wherein:
 the material from which said disc spring is composed is selected from materials having deflection and yield characteristics approximating that of mild steel.

5. A valve mechanism as recited in claim 1, wherein:
 the material from which said disc spring is composed is selected from a group of metal material having effective resistance to deterioration in service conditions where high concentrations of hydrogen sulfide are present.

6. A valve mechanism as recited in claim 1, wherein:
 said annular disc spring is formed of a material such that when deformed from said substantially flat configuration to said frusto-conical configuration, substantially spring deflection will occur with consequent minimum variation in spring force.

7. A valve mechanism as recited in claim 1, wherein:
 the seat pocket is formed within wide manufacturing tolerances; and
 said annular disc spring becomes deformed from said originally substantially flat condition thereof to said frusto-conical configuration to develop a mechanical preload force urging said seat member against said valve element, said disc spring becoming permanently deformed when said manufacturing tolerance is such that the material of said seat spring is deformed beyond the elastic limits thereof.

8. A valve mechanism comprising:
 a valve body defining a valve chamber and defining a flow passage intersecting said valve chamber, said valve body being formed to define at least one seat pocket within said valve body and defining first spring engaging means;
 a valve element being positioned within said valve chamber and being movable between open and closed positions to control the flow of fluid through said valve mechanism;
 a valve seat member being received within said seat pocket and defining seal means for sealing engagement with said valve element, said seat member defining second spring engagement means; and at least one of said seat pocket, valve element and valve seat member having a range of tolerance variations between minimum and maximum limits;

an annular universal disc spring element being located within said seat pocket and being engaged at the inner peripheral portion thereof by one of said first and second spring engagement means and being engaged at the outer peripheral portion thereof by the other of said first and second spring engagement means, said disc spring element being yielded from an initial substantially flat configuration to a generally dished configuration by relative movement between said first and second spring engagement means and transmitting a sealing force to said seat member to establish initial sealing between said seat member and said valve element, yielding of said spring member being beyond the elastic limits thereof through a least a portion of the range of tolerance variations between said minimum and maximum limits to compensate for said tolerance variations.

9. A valve mechanism as recited in claim 8, wherein:
the spring material from which said disc spring is composed is selected from those materials having limited variation in spring force from the yield point of the material to the point of maximum deflection beyond said yield point, whereby the force exerted by said disc spring against said valve seat and hence against said valve element is within a predetermined narrow range regardless of the degree of yielding of said spring member.

10. A valve mechanism as recited in claim 8, wherein:
the material from which said disc spring is composed is selected from materials having deflection and yield characteristics approximating that of mild steel.

11. A valve mechanism as recited in claim 8, wherein:
the material from which said disc spring is composed is selected from a group of metal material having effective resistance to deterioration in service conditions where high concentrations of hydrogen sulfide are present.

12. A valve mechanism as recited in claim 8, wherein:
said annular disc spring is formed of a material such that when deformed from said substantially flat configuration to a said dished configuration, substantial spring deflection will occur with consequent minimum variation in spring force.

13. A valve mechanism as recited in claim 8, wherein:
the seat pocket is formed within wide manufacturing tolerances; and
said annular disc spring becomes deformed from said originally substantially flat condition thereof to said frusto-conical configuration to develop a mechanical preload force urging said seat member against said valve element, said disc spring becoming permanently deformed when said manufacturing tolerance is such that the material of said seat spring is deformed beyond the elastic limits thereof.

14. A valve mechanism as recited in claim 8, wherein:
the depth of said seat pocket having a range of tolerance variation between a minimum seat pocket depth and a maximum seat pocket depth; and
the yielding of said spring member beyond the elastic limits thereof occuring through at least a portion of the range of tolerance variation between said minimum and maximum seat pocket depths.

15. A valve mechanism as recited in claim 14, wherein:
said disc spring element being subjected to minimum yielding when said seat pocket depth is at the maximum tolerance variation and being subjected to maximum yielding when said seat pocket depth is at the minimum tolerance variation.

16. A valve mechanism comprising:
a valve body defining a valve chamber and a flow passage intersecting the valve chamber, said valve body having stepped annular shoulders facing the valve chamber to define a seat pocket within said valve body, said shoulders being in parallel spaced relation to each other to form inner and outer stop shoulders with the spacing between the shoulders defining the depth of the seat pocket;
a valve element positioned within said valve chamber and being movable between open and closed positions to control the flow of fluid through said valve mechanism;
a valve seat member received within said seat pocket and defining seal means for sealing engagement with said valve element; and
an annular disc spring element mounted within said seat pocket and having an outer peripheral portion seated on said outer stop shoulder and an inner peripheral portion normally spaced from said inner stop shoulder and in engagement with said valve seat member, and deforming said spring element about an inner edge of said outer stop shoulder from an initial substantially flat configuration to a generally dished configuration by movement of said valve seat relative to said outer stop shoulder, whereby said spring element transmits a sealing force to said valve seat member to establish sealing between said valve seat member and said valve element.

17. The valve mechanism of claim 16 wherein said seat pocket has an annular bottom surface facing said valve chamber and being disposed in a parallel spaced relation to and outwardly of said outer stop shoulder, the distance between said bottom surface and said outer stop shoulder equals the maximum distance that said disc spring element may deform.

* * * * *